United States Patent
Hempstead (10) Patent No.: US 7,163,136 B2
(45) Date of Patent: Jan. 16, 2007

(54) APPARATUS AND METHOD FOR FRICTION STIR WELDING UTILIZING A GROOVED PIN

(75) Inventor: George D. Hempstead, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 10/651,463

(22) Filed: Aug. 29, 2003

(65) Prior Publication Data

US 2004/0035914 A1 Feb. 26, 2004

(51) Int. Cl.
*B23K 20/12* (2006.01)
*B23K 37/00* (2006.01)
*B23K 31/02* (2006.01)

(52) U.S. Cl. .................. 228/2.1; 228/112.1
(58) Field of Classification Search ........ 228/2.1, 228/112.1
See application file for complete search history.

(56) References Cited

U.S. PATENT DOCUMENTS

| | | | |
|---|---|---|---|
| 5,460,317 A * | 10/1995 | Thomas et al. ........ 228/112.1 |
| 5,611,479 A | 3/1997 | Rosen | |
| 5,697,544 A * | 12/1997 | Wykes ............... 228/2.1 |
| 5,718,366 A | 2/1998 | Colligan | |
| 6,029,879 A | 2/2000 | Cocks | |
| 6,053,391 A * | 4/2000 | Heideman et al. ........ 228/2.1 |
| 6,070,784 A | 6/2000 | Holt et al. | |
| 6,199,745 B1 | 3/2001 | Campbell et al. | |
| 6,206,268 B1 * | 3/2001 | Mahoney ............ 228/112.1 |
| 6,213,379 B1 | 4/2001 | Takeshita et al. | |
| 6,227,430 B1 | 5/2001 | Rosen et al. | |
| 6,230,958 B1 | 5/2001 | Coletta et al. | |
| 6,247,634 B1 | 6/2001 | Whitehouse | |
| 6,299,050 B1 | 10/2001 | Okamura et al. | |
| 6,557,746 B1 | 5/2003 | Ezumi et al. | |
| 6,595,403 B1 | 7/2003 | Okamura et al. | |
| 6,676,008 B1 * | 1/2004 | Trapp et al. ............ 228/112.1 |
| 6,811,632 B1 * | 11/2004 | Nelson et al. ........... 156/73.5 |
| 2002/0030081 A1 | 3/2002 | Ezuml et al. | |
| 2002/0092885 A1 | 7/2002 | Ezumi et al. | |
| 2003/0205565 A1 * | 11/2003 | Nelson et al. ........... 219/148 |

(Continued)

FOREIGN PATENT DOCUMENTS

GB 2 306 366 A 5/1997

(Continued)

OTHER PUBLICATIONS

European Search Report filed on Form EPO Form 1503 03.82 (P04C01), Application No. EP 03 02 7892, The Boeing Company.

Primary Examiner—Lynne R. Edmondson
(74) Attorney, Agent, or Firm—Alston & Bird LLP (57) ABSTRACT

A tool for forming a friction stir weld joint in a workpiece is provided. According to one embodiment, the tool includes a rotatable pin having first and second ends and defining a stirring portion therebetween structured to frictionally engage the workpiece so as to at least partially form the friction stir weld joint. In particular, the stirring portion of the pin defines at least one groove and ridge, each of which extend generally circumferentially around an axis of the pin. The tool can also include a second shoulder opposing the first shoulder such that the pin extends therebetween.

42 Claims, 7 Drawing Sheets

U.S. PATENT DOCUMENTS

2004/0074948 A1* 4/2004 Kusunoki et al. ........ 228/112.1
2004/0108359 A1* 6/2004 Hashimoto et al. ........... 228/21

FOREIGN PATENT DOCUMENTS

| GB | 2306366 A | * | 5/1997 |
| JP | 2000-33484 | | 2/2000 |
| JP | 2000033484 A | | 2/2000 |
| JP | 2002086281 A | | 3/2002 |
| JP | 2002-263863 | | 9/2002 |
| JP | 2002263863 A | | 9/2002 |
| WO | WO 99/52669 A | | 10/1999 |

* cited by examiner

APPARATUS AND METHOD FOR FRICTION STIR WELDING UTILIZING A GROOVED PIN

BACKGROUND OF THE INVENTION

1) Field of the Invention

The present invention relates to friction welding and, more specifically, to an apparatus and method for friction stir welding with a pin having one or more grooves thereon.

2) Description of Related Art

Friction stir welding is a process in which a rotating tool, such as a threaded pin or probe, is urged into and/or through a workpiece, e.g., to join multiple members of the workpiece in a solid state or to repair cracks in a workpiece. Typically, the pin extends from a concave shoulder, and the shoulder is urged against the workpiece so that the pin is urged therein. The pin is then urged through the workpiece to form a continuous weld joint. For example, during one conventional friction stir welding process, the probe of the rotating tool is plunged into a workpiece or between two workpieces by a friction stir welding machine (not shown) to produce the required resistance force to generate sufficient frictional heating to form a region of plasticized material. The tool is typically tilted approximately 3° relative to the workpiece such that the trailing edge of the concave shoulder is thrust into and consolidates the plasticized material. Upon solidification of the plasticized material, the members of the workpiece are joined along the weld joint. The magnitude of force exerted by the friction stir welding tool must be maintained above a prescribed minimum in order to generate the required frictional heating. Friction stir welding is further described in U.S. Pat. No. 5,460,317 to Thomas et al., the contents of which are incorporated herein by reference.

Helical threads can be provided on the pin to increase the mixing of the plasticized material in the region of the weld joint. The helical threads on the probe can be right-hand threads, left-hand threads, or a combination thereof. Alternatively, the pin can be cylindrical. In either case, a support device is often provided behind the weld joint, e.g., an anvil or other backing device provided opposite the shoulder, to prevent deformation of the workpiece by the forces exerted by the friction stir welding tool and maintain dimensional tolerances. The shoulder and the backing device are typically urged together during welding to prevent material that is plasticized by the friction heat generated by the welding tool from flowing out of the weld joint. The inward clamping of the shoulder and backing device also consolidates the joint to minimize porosity and provide a weld joint having the desired surface finish.

A welding machine that is used to move the friction stir welding tool through the workpiece must often exert significant forces on the welding tool to move the welding tool at a particular speed through the workpiece. The force can depend in part on the thickness of the workpiece, the material of the workpiece, the length and thickness of the pin of the tool, the rotational speed of the tool, the speed of the tool through the workpiece, and the like. In some cases, the forces on the welding tool can be significant, and can require periodic maintenance and repairs of the welding tool and welding machine or limit the useful life of the welding tool and machine. Additionally, the forces required to achieve a particular weld joint at a desired speed can exceed the capacity of some machines, thereby requiring a slower rate for forming the weld, a different type of weld, or a different machine for driving the welding tool.

Thus, there is a need for an improved friction stir welding tool for forming weld joints between workpieces. The tool should be capable of effectively supporting a weld joint and constraining the plasticized material within the weld joint during friction stir welding. The tool should allow for friction stir welding of a variety of workpieces, including thick workpieces, using a variety of welding machines and tools. Preferably, the tool should require reduced forces on the tool and machine during welding.

SUMMARY OF THE INVENTION

The present invention provides a tool and method for forming a friction stir weld joint in a workpiece. The tool includes a rotatable pin defining a stirring portion that is characterized by at least one groove and at least one ridge. Each of the groove(s) and ridge(s) can extend perpendicular to a longitudinal axis of the pin, and the each of the grooves can be discontinuous from the others and separated by the ridges. The pin can be rotated to plasticize the material of the workpiece, and can be moved through the workpiece to form a weld joint. In some embodiments, a reduced force is required for moving the tool through the workpiece as compared to comparable friction stir welding processes employing pins without groove(s). The pin can extend from a shoulder or between two shoulders, each of which can be structured to engage the workpiece and thereby constrain the plasticized material.

The pin can define two or more of the grooves, and each successive groove can be separated by a respective one of the ridges. Each of the grooves and ridges can extend in a continuous and circumferential path around the pin. In addition, the grooves can be defined by sidewalls that extend perpendicular or at oblique angles relative to the axis of the pin so that the grooves are uniform or taper in width. The width of each groove can be, e.g., between about 0.025 and 0.25 inches, and can be at least about twice the depth of the groove.

According to one embodiment of the present invention, the pin extends between first and second opposite shoulders, each of which can define a frictional feature thereon. The second shoulder can be adjustable relative to the first shoulder so that the length of the stirring portion of the pin between the shoulders can be adjusted. Further, the shoulders can define a taper at an outer circumference thereof.

The present invention also provides a method of friction stir welding a workpiece, in which a pin is provided to extend from a first shoulder. The pin, which has a stirring portion defining at least one groove and at least one ridge, is rotated so that the stirring portion frictionally engages the workpiece to form a friction stir weld joint. The rotating pin is urged in a direction generally perpendicular to the axial direction of the pin such that the pin moves parallel to a plane defined by the grooves and ridges thereof. The second shoulder can also be adjusted relative to the first shoulder to adjust a length of the stirring portion of the pin. According to one aspect, an aperture is drilled in the workpiece, a connection portion of the pin is inserted through the aperture, and the connection portion of the pin is connected to the second shoulder.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
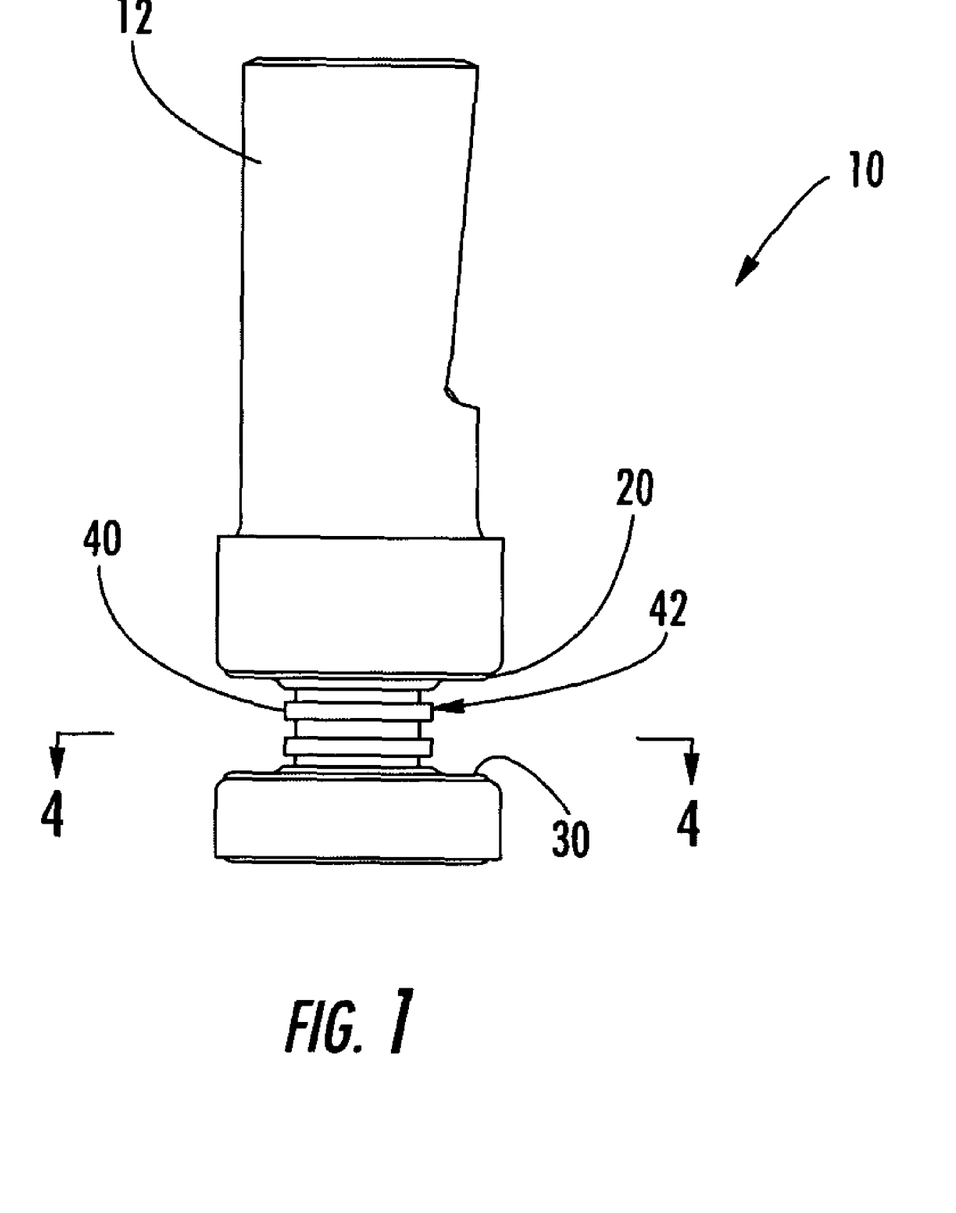
FIG. 1 is an elevation view illustrating a friction stir welding tool according to one embodiment of the present invention.
Figure 2:
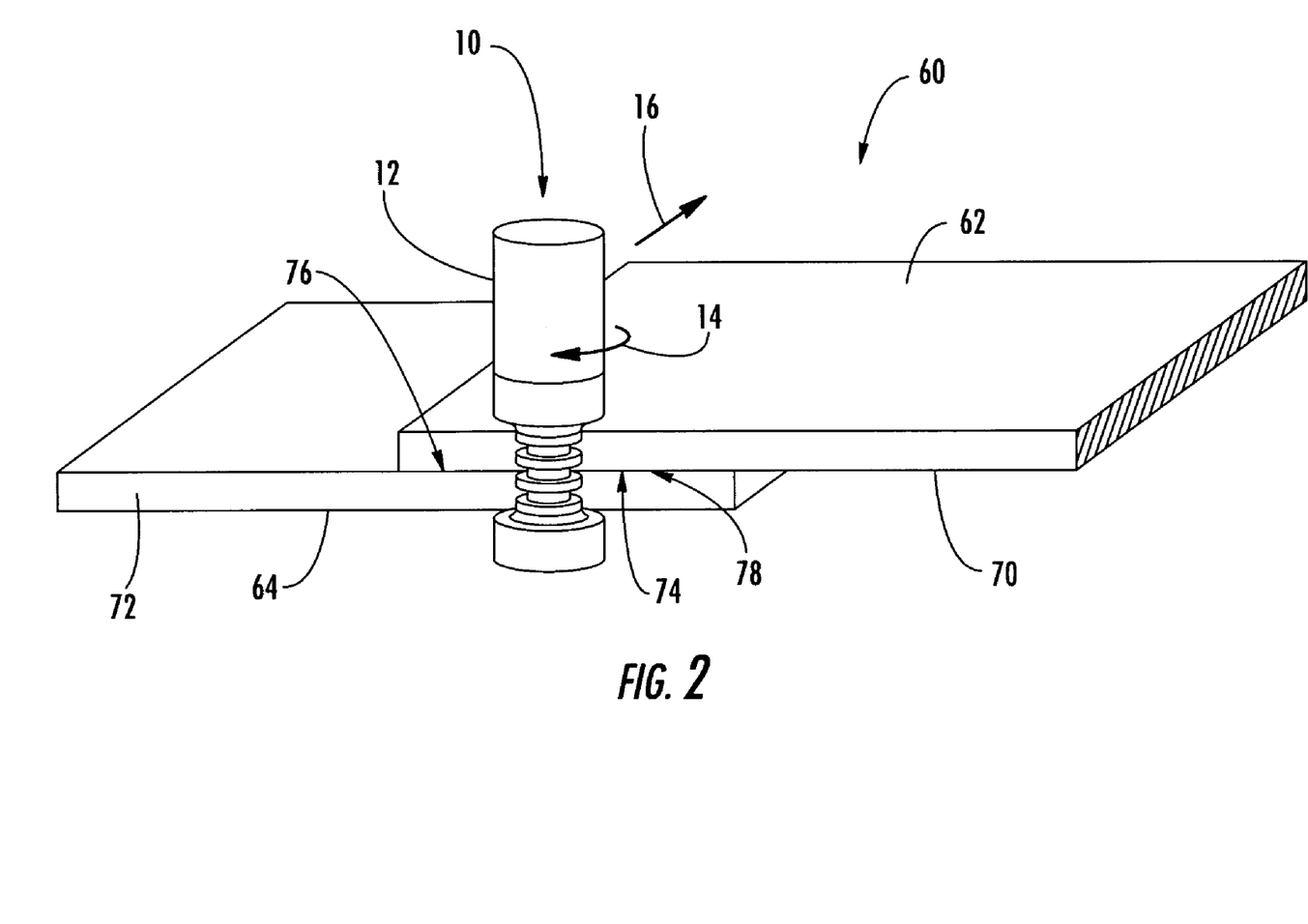
FIG. 2 is a perspective view illustrating a friction stir welding tool according to another embodiment of the present invention configured for friction stir welding a workpiece having two structural members.
Figure 2A:
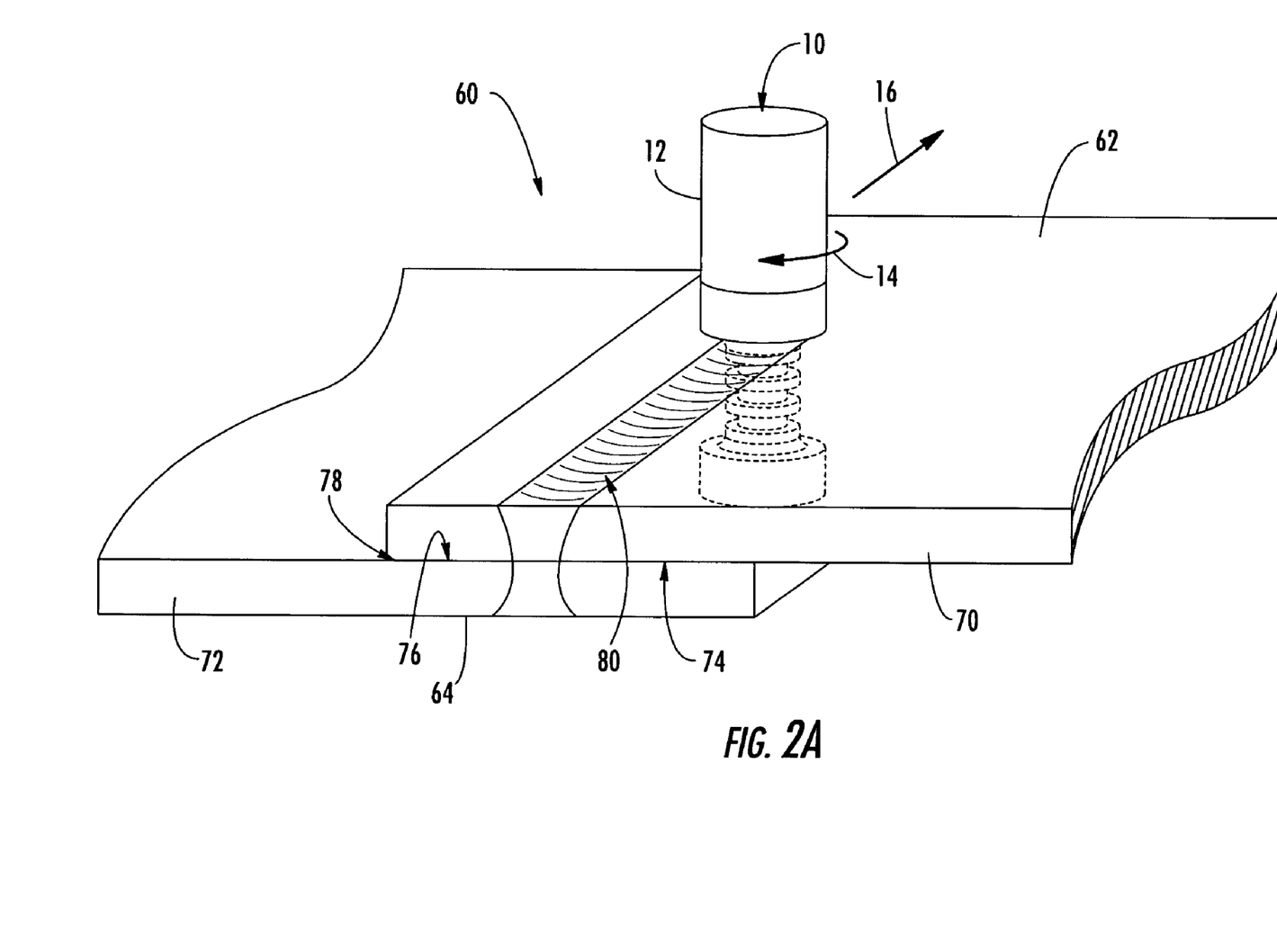
FIG. 2A is a perspective view illustrating the friction stir welding tool of FIG. 2, shown with a friction stir weld joint partially formed in the workpiece.

Referring now to the drawings and, in particular, to FIG. 1, there is shown a friction stir welding tool 10, according to one embodiment of the present invention, for friction stir welding a workpiece 60, such as the workpiece 60 shown in FIGS. 2 and 2A. The friction stir welding tool 10 is configured to be actuated by a machine having one or more actuators (not shown) for rotating the tool 10 and moving the tool 10 through the workpiece 60 to form a friction weld joint 80. For example, the friction stir welding tool 10 can include a connection portion 12 that can be engaged to a chuck, spindle, or other member of a machine such as a milling machine or a drill. The machine structured for rotating the friction stir welding tool 10 can be operated manually, but preferably is operated by a computer, microprocessor, microcontroller or the like operating under software control.

The term "workpiece" is not meant to be limiting, and it is understood that the workpiece 60 can include one or more structural members, which can be configured in various configurations. For example, as shown in FIGS. 2 and 2A, faying surfaces 74, 76 of two structural members 70, 72 can be overlapped to form an interface 78, and the friction stir welding tool 10 can be used to form a weld joint 80, and in particular a lap joint in FIG. 2A, that extends along the interface 78, thereby joining the structural members 70, 72. Alternatively, the structural members 70, 72 can be positioned in other configurations, and more than two structural members can be joined by a single joint 80. In another embodiment, the workpiece 60 can include a single structural member and the friction stir welding tool 10 can be used to form a weld joint 80 in the member, e.g., to repair a crack, hole, or other defect therein or to affect the material properties of the structural member.

The structural members 70, 72 can be formed of a variety of materials including, but not limited to, aluminum, aluminum alloys, titanium, titanium alloys, steel, and the like. Non-metal materials can also be welded with the friction stir welding tool 10, e.g., materials such as polymers and the like. Further, the workpiece 60 can include members of similar or dissimilar materials, for example, structural members formed of different metals, including metals that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces formed of unweldable materials to be securely joined. Friction stir welding also can be used to securely join weldable materials to other weldable and to unweldable materials. Thus, the materials that form the workpiece 60 can be chosen from a wider variety of light weight, high strength metals and alloys, thereby facilitating reduction of the overall weight of the workpiece 60 and a structural assembly formed therefrom.

The workpieces 60 formed according to the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir welding tool 10 of the present invention can be used for friction stir welding large workpieces 60 and workpieces 60 having curvilinear geometries. In some applications, the members 70, 72 are joined in geometrical configurations that make difficult, or prevent, access to the opposing sides 62, 64 of the workpiece 60. For example, the structural members 70, 72 can be overlapped and joined to form a partially or fully closed body such as a tube or an airplane wing.

Figure 3:
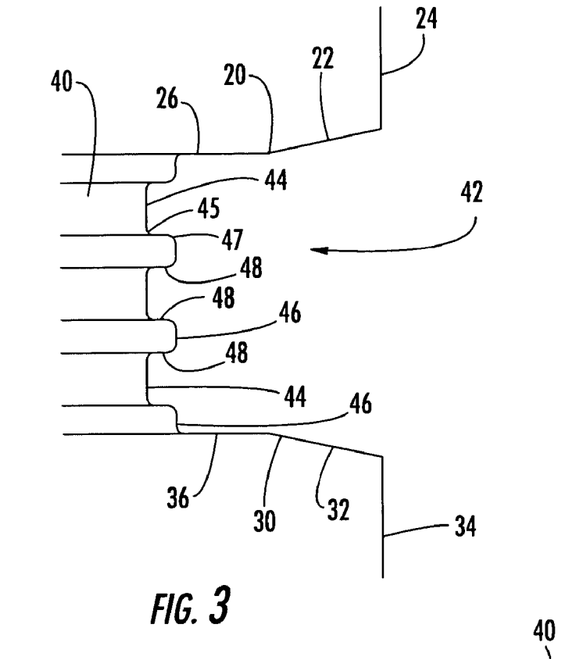
FIG. 3 is an enlarged elevation view illustrating a portion of the pin of the friction stir welding tool of FIG. 1.

As illustrated in FIGS. 1 and 3, the friction stir welding tool 10 of one embodiment includes a first shoulder 20, a second shoulder 30, and a pin 40 extending therebetween. The pin 40 and shoulders 20, 30 are preferably formed of a material having high strength and heat resistance. For purposes of example only and not limitation, the pin 40 and/or shoulders 20, 30 can be constructed of tool steel, a molybdenum alloy, such as TZM, and nickel alloys, such as Rene 41 (UNS N07041). The first and second shoulders 20, 30 can be formed in a variety of configurations and can be structured to be urged against the opposite sides 62, 64 of the workpiece 60 to frictionally engage the workpiece 60 therebetween. For example, each of the shoulders 20, 30 can define a generally flat, concave, or convex surface facing the workpiece 60. As shown in FIG. 3, each of the shoulders 20, 30 defines a flat portion 26, 36 proximate to the pin 40 and defines a tapered portion 22, 32 at the outer circumference or rim 24, 34 of the shoulder 20, 30. In some embodiments, the tapered portion 22, 32 of the shoulders 20, 30 can prevent or reduce the occurrence of "plowing," in which plasticized material from the workpiece 60 is pushed radially outside the circumference of the shoulders 20, 30 as the tool 10 is moved along the workpiece 60. For example, the taper 22, 32 can extend over about half the radial distance between the outer edge 24, 34 of the respective shoulder 20, 30 and the pin 40, and the taper 22, 32 can define an angle of between about 3° and 5° relative to the planar portion 26, 36 of the respective shoulder 20, 30.

Figure 3A:
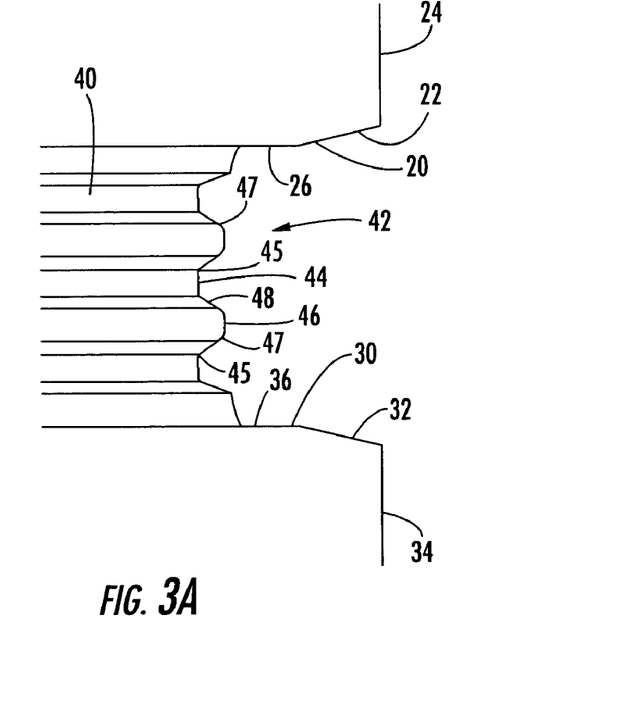
FIG. 3A is an enlarged elevation view illustrating a portion of the pin of a friction stir welding tool according to another embodiment of the present invention.

The pin 40 extends between the shoulders 20, 30 and defines a stirring portion 42, i.e., a portion of the pin 40 that engages the workpiece 60 during welding. The stirring portion 42 of the pin 40 defines at least one groove 44 and at least one ridge 46. The grooves 44 are characterized by a diametrical size of the pin 40 that is smaller than the adjacent ridges 46, and, therefore, the grooves 44 are defined between, and separated by, the ridges 46. The pin 40 can define any number or grooves 44 and ridges 46. For example, as illustrated in FIG. 3, the pin 40 has three grooves 44 and four ridges 46. In other embodiments, the pin 40 can include as few as one groove 44 or more than three grooves 44. Likewise, the pin 40 may have as few as two ridges 46 or more than four ridges 46 such that each groove 44 is disposed between a pair of the ridges 46. Further, each adjacent groove 44 and ridge 46 is connected by a sidewall 48, such that the sidewalls 48 at least partially define the grooves 44. The sidewalls 48 can be perpendicular to an axis of the pin 40 so that the width of each groove 44 is uniform throughout most, if not all, of the depth of the groove 44. Alternatively, as illustrated in FIG. 3A, the sidewalls 48 can be oblique to the axis of the pin 40, e.g., with the sidewalls 48 tapering radially inward so that the width of each groove 44 decreases in a direction radially inward toward the axis of the pin 40. In other embodiments, the sidewalls 48 of each groove 44 can converge such that the groove 44 is generally v-shaped.

The size of the grooves 44 can also vary and can be selected according to the material of the workpiece 60, the desired speed of welding, and the like. For example, according to one embodiment of the present invention, the width of each groove 44 is at least about twice the depth of the groove 44. The depth of the groove is defined by the radial distance between an inner diameter of the groove 44 and an outer diameter of the adjacent ridges 46, and the width of each groove 44 is measured in the axial direction at the outer diameter of the pin 40, i.e., between the ridges 46. In particular, the width of each groove 44 can be, for example, between about 0.01 and 0.5 inches and, in some embodiments, between about 0.025 and 0.25 inches, such as about 0.05 inches. As illustrated in FIG. 3, each groove 44 is about 0.047 in width and between about 0.02 and 0.025 inches deep. The ridges 46 illustrated in FIG. 3 are about 0.03 inches wide and have a height equal to the depth of the grooves 44. Thus, the tool 10 shown in FIG. 3 can be used to weld a workpiece 60 having a thickness of about 0.25 inches. According to another embodiment of the invention, a tool used for welding a workpiece that is 0.5 inches thick can have grooves that are between about 0.12 and 0.2 inches wide. The dimensions and shape of the grooves 44 and ridges 46 can be similar throughout the pin 40, or some of the grooves 44 and ridges 46 can define shapes and/or sizes that are different than those of other grooves 44 and ridges 46 of the pin 40. As illustrated in FIGS. 3 and 3A, the corners 45 and edges 47 of the grooves 44 and ridges 46 can be rounded, i.e., to define fillets and radii, as will be appreciated by those skilled in the art.

Figure 4:
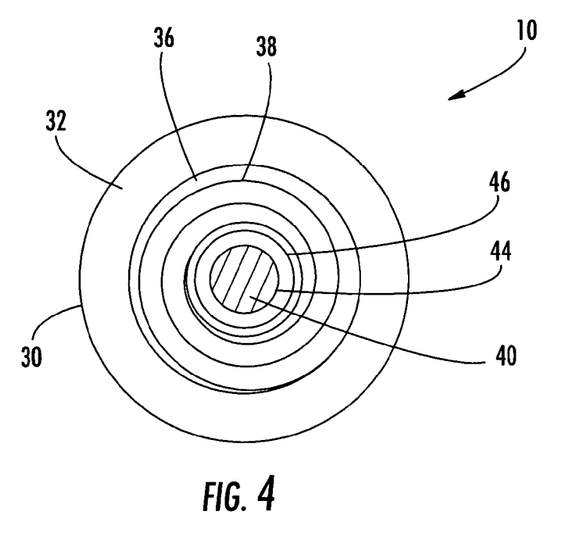
FIG. 4 is a plan view illustrating the pin and shoulder of the friction stir welding tool of FIG. 1, as seen along line 4—4 of FIG. 1.

Generally, the grooves 44 and ridges 46 extend in a continuous and circumferential path around the pin 40. Thus, while each individual groove 44 and ridge 46 generally extends continuously about the pin 40, each groove 44 and ridge 46 is advantageously disconnected or discrete from the other grooves 44 and ridges 46, respectively. A cross section of the grooves 44 and ridges 46 perpendicular to the axis of the pin 40 can be circular, as illustrated in FIG. 4, or can define other polygonal shapes such as rectangles, squares, triangles, ellipses, and the like.

In some embodiments of the present invention, each groove 44 and ridge 46 also extends generally perpendicular to the axis of the pin 40. Thus, the pin 40 can be moved through the workpiece 60 in a plane of motion perpendicular to the axis of the pin 40, i.e., so that the grooves 44 and ridges 46 are generally parallel to the direction of movement. Although the invention is not limited to any particular theory of operation, it is believed that the configuration of the grooves 44 on the pin 40 is related to the force required to move the pin 40 through the workpiece 60 and to the movement of the plasticized material during welding. In particular, it is believed that the configuration of the grooves 44 on the pin 40 of the present invention reduces the force required to move the pin 40 through the workpiece 60. Further, it is believed that the configuration of the grooves 44 reduces the movement of the plasticized material axially outward from the opposed sides 62, 64 of the workpiece 60, so that the shape of the surfaces 62, 64 of the workpiece 60 is generally maintained during welding.

In addition, the shoulders 20, 30 can be structured to frictionally engage the workpiece 60 during operation of the tool 10 to thereby at least partially form the friction stir weld joint 80. In one embodiment of the present invention, one or both of the shoulders 20, 30 define one or more frictional features, e.g., raised portions or surfaces such as threads, bumps, or ribs that are structured to frictionally engage the workpiece 60. For example, as illustrated in FIG. 4, a spiral thread 38 is provided on the planar portion 36 of the second shoulder 30. In other embodiments, such threads can be provided on the tapered and/or planar portions 22, 32, 26, 36 of the first and/or second shoulders 20, 30. To ensure that these features are in contact with the opposed surfaces 62, 64 of the workpiece 60 to be welded, the length of the pin 40 and therefore the separation of the shoulders 20, 30 is generally about equal to the combined thickness of the members 70, 72 to be joined.

According to one embodiment of the present invention, a friction stir weld joint 80 is formed by moving the rotating friction stir welding tool 10 into contact with the workpiece 60 so that the stirring portion 42 of the pin 40 and the shoulders 20, 30 frictionally engage the workpiece 60. The rotating friction stir welding tool 10 can be moved through the workpiece 60 along a predetermined path to thereby form the elongate weld joint 80. During friction stir welding, the portions of the workpiece 60 proximate to the pin 40 are "sandwiched" between the first shoulder 20 and the second shoulder 30. Advantageously, the shoulders 20, 30 create a seal that prevents the plasticized material from being extruded therefrom. For example, as shown in FIG. 2, the weld tool 10 can be configured at an edge of workpiece 60, rotated in a direction 14, and urged in a direction 16 through the workpiece 60. Each of the shoulders 20, 30 can contact the surfaces 62, 64 of the workpiece 60, as shown in FIG. 2A, thereby constraining the axial movement of the plasticized material of the workpiece 60. Thus, planar or otherwise desired contours can be formed on the opposing sides 62, 64 of the workpiece at the weld joint 80. Further, the shoulders 20, 30 can restrain the tool 10 axially against the workpiece 60 so that little or no axial force needs to be applied to the tool 10 during welding.

Figure 5:
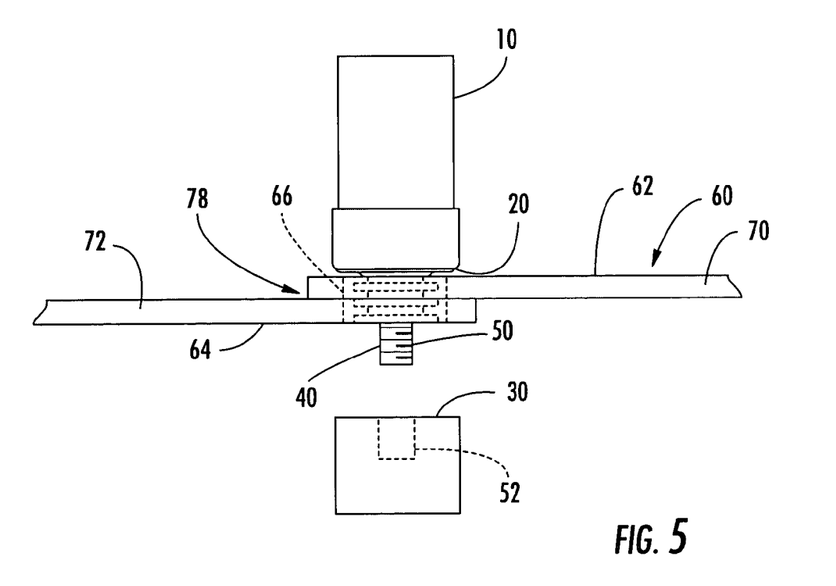
FIG. 5 is an elevation view illustrating a friction stir welding tool according to another embodiment of the present invention configured for friction stir welding a workpiece having two structural members.

The shoulders 20, 30 can be fixedly attached to the pin 10, or one or both of the shoulders 20, 30 can be removable from the pin 40. For example, as shown in FIG. 5, the pin 40 can define a connection portion 50, having threads or other connection features thereon. A corresponding connection feature, such as a threaded aperture 52, can be provided in the second shoulder 20 to receive the threaded connection portion 50 of the pin 40. Thus, the second shoulder 30 can be removed from the pin 40 and the pin 40 can be extended through a hole 66 in the workpiece 60. The second shoulder 30 can then be attached to the pin 40, and the tool 10 can be used thereafter to frictionally weld the workpiece 60. If the weld joint 80 ends at an edge of the workpiece 60, the tool 10 can be removed from the workpiece 60 without passing either of the shoulders 20, 30 through the workpiece 60. Alternatively, the second shoulder 30 can be removed from the pin 40 after welding the workpiece 60, and the pin 40 can then be retracted from the workpiece 60. In another embodiment, one or more holes larger than the hole 66 can be provided in the workpiece 60, each hole being large enough to receive the second shoulder 30 so that the shoulder 30 can be inserted into and/or removed through the workpiece 60 without removing the shoulder 30 from the pin 40.

Further, the second shoulder 30 can be adjustable relative to the first shoulder 20 so that the length of the stirring portion 42 of the pin 40 can be adjusted. In some embodiments, the second shoulder 30 can be rotated or otherwise actuated independently of the first shoulder 20 and/or the pin 40. For example, the second shoulder 30 can be urged toward the first shoulder 20 during a welding operation to squeeze the workpiece 60 between the two shoulders 30, 40. Apparatuses and methods for independently actuating opposed shoulders are additionally provided in U.S. application Ser. No. 10/237,506, filed Sep. 9, 2002, which is assigned to the assignee of the present application and the contents of which is herein incorporated in its entirety by reference.

In other embodiments of the present invention, the tool 10 can be used without one or both of the shoulders 20, 30. For example, the tool 10 shown in FIG. 5 can be operated without the second shoulder 30 by urging the first shoulder 20 against the first side 62 of the workpiece 60 with the pin 40 extending at least partially through the workpiece 60. The urging force of the first shoulder 20 against the workpiece 60 can be opposed by an anvil or other support device, or the workpiece 60 can be sufficiently strong to oppose the urging force.

Figure 6:
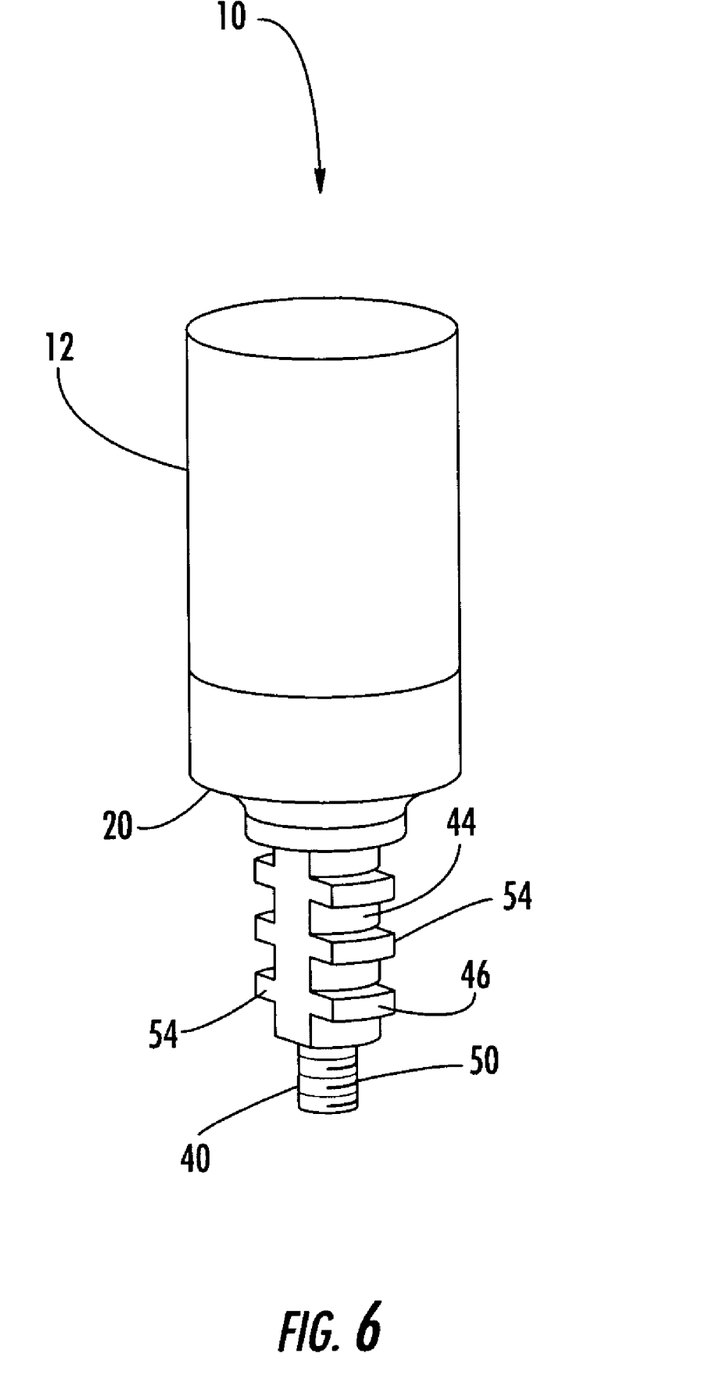
FIG. 6 is a perspective view of a friction stir welding tool according to yet another embodiment of the present invention, having a pin defining two surfaces that extend along the length of the stirring portion of the pin and interrupt the grooves and ridges of the pin.

Further, the grooves 44 of the tool 10 need not extend continuously around the pin 40. For example, as illustrated in FIG. 6, the pin 40 can define one or more surfaces 54 that are not grooved and extend at least partially along the length of the pin 40, such that the surfaces 54 interrupt the grooves 44 and ridges 46. Any number of the surfaces 54 can be provided on the pin 40, and each surface 54 can be flat, curved, or otherwise contoured. As shown in FIG. 6, the two surfaces 54 are diametrically opposed and extend the length of the stirring portion 42 of the pin 40, though in other embodiments, the surfaces 54 can be shorter and/or or otherwise located on the pin 40.

Figure 7:
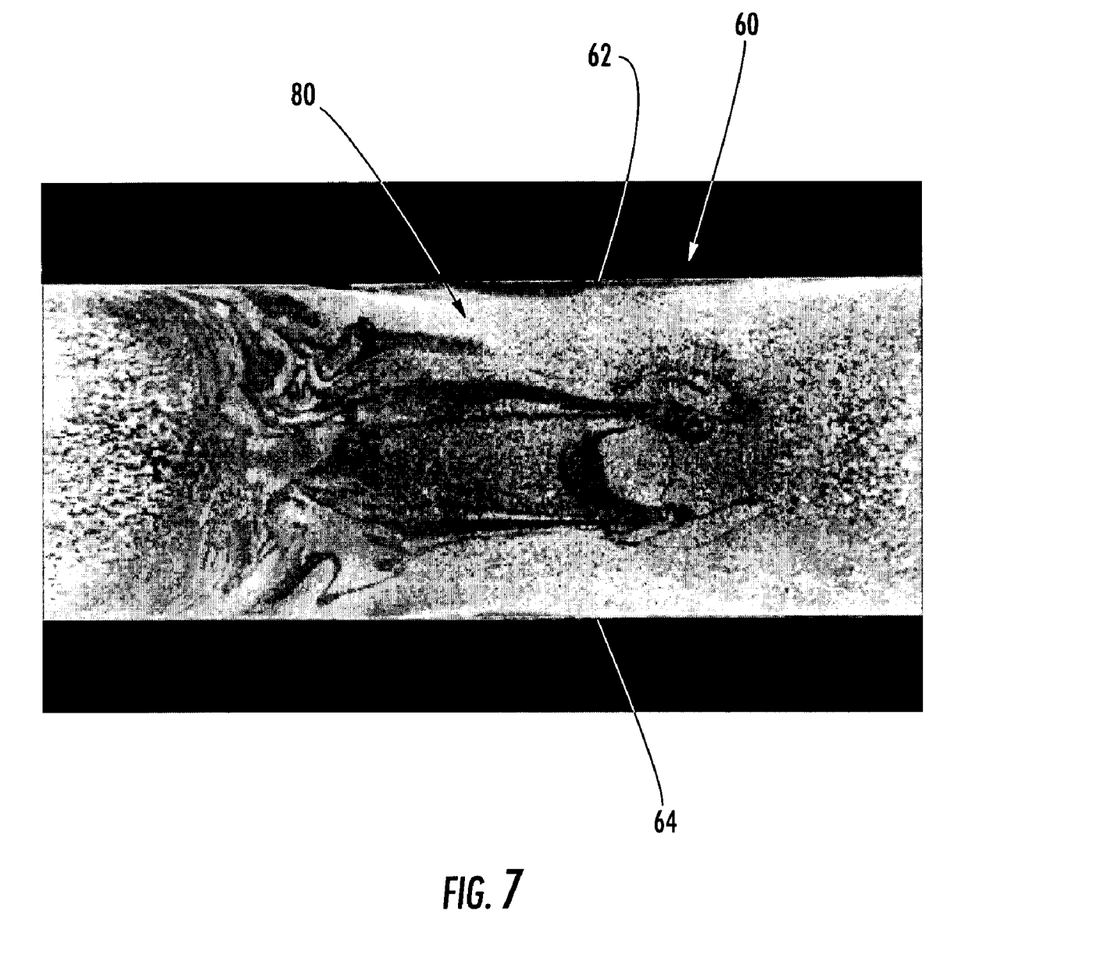
FIG. 7 is a section view of a workpiece welded using the friction stir welding tool of FIG. 1 according to one embodiment of the present invention.

FIG. 7 illustrates a portion of a workpiece 60 including a single aluminum plate of 0.25 inch thickness, in which a friction stir weld joint 80 has been formed according one embodiment of the present invention. In particular, the joint 80 was formed using a pin 40 similar to the one illustrated in FIG. 1, the pin 40 being rotated, configured in a direction extending between the first and second sides 62, 64 of the workpiece 60, and urged through the workpiece 60 in a direction perpendicular to the plane of the page. As shown in FIG. 7, the material of the workpiece 60 has been mixed by the pin 40, and the grain size of the material has been refined, thereby improving the material properties of the material at the joint 80.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tool for forming a friction stir weld joint in a workpiece, the tool comprising:
    a first shoulder structured to be urged against the workpiece; and
    a rotatable pin extending from the first shoulder and structured to rotate with the first shoulder, the rotatable pin having first and second ends and defining a stirring portion therebetween structured to frictionally engage the workpiece with the first shoulder so as to at least partially form the friction stir weld joint,
    wherein the stirring portion of the pin defines a plurality of grooves and ridges, each groove and ridge extending perpendicular to an axis of the pin.

2. A tool according to claim 1 wherein the pin defines at least two of the grooves, successive ones of the grooves being separated by a respective one of the ridges.

3. A tool according to claim 1 wherein each groove extends in a continuous and circumferential path around the pin.

4. A tool according to claim 1 wherein each groove is defined at least partially by a sidewall, each sidewall extending at an oblique angle relative to an axis of the pin such that each groove tapers in width in a direction radially inward toward the axis of the pin.

5. A tool according to claim 1 wherein each groove is defined at least partially by a sidewall, each sidewall extending perpendicular to an axis of the pin such that each groove defines a uniform width.

6. A tool according to claim 1 wherein each groove defines a depth defined by the radial distance between an inner diameter of the groove and an outer diameter of each ridge, each groove defines a width in the axial direction of the pin at an outer diameter of the groove, and the width of each groove is at least about twice the depth of the groove.

7. A tool according to claim 1 wherein each groove defines a width in the axial direction of the pin at an outer diameter of the groove, and the width of each groove is between about 0.025 and 0.25 inches.

8. A tool according to claim 1 further comprising a second shoulder opposed to the first shoulder, the pin extending between the first and second shoulders.

9. A tool according to claim 8 wherein at least one of the shoulders defines at least one frictional feature thereon.

10. A tool according to claim 8 wherein the second shoulder is adjustable relative to the first shoulder such that a length of the stirring portion of the pin between the shoulders is configured to be adjusted.

11. A tool according to claim 8 wherein at least one of the shoulders defines a taper at an outer circumference thereof.

12. A tool according to claim 1 wherein each of the grooves defines a circular circumference having a first diameter and each of the ridges defines a circular circumference having a second diameter.

13. A tool according to claim 1 wherein the pin defines at least one surface extending at least partially along the length of the stirring portion of the pin such that the surface interrupts the grooves and ridges of the pin.

14. A tool for forming a friction stir weld joint in a workpiece, the tool comprising:
    first and second opposing shoulders, each shoulder structured to be urged against the workpiece; and
    a rotatable pin extending axially between the first and second shoulders and defining a stirring portion therebetween, the rotatable pin being structured to rotate with the first and second shoulders such that the rotatable pin and the first and second shoulders are structured to frictionally engage the workpiece and at least partially form the friction stir weld joint,
    wherein the stirring portion of the pin defines at least one groove and at least one ridge, each groove and ridge extending perpendicular to the axis of the pin.

15. A tool according to claim 14 wherein the pin defines at least two of the grooves, successive ones of the grooves being separated by a respective one of the ridges.

16. A tool according to claim 14 wherein each groove extends in a continuous and circumferential path around the pin.

17. A tool according to claim 14 wherein each groove is defined at least partially by a sidewall, each sidewall extending at an oblique angle relative to an axis of the pin such that each groove tapers in width in a direction radially inward toward the axis of the pin.

18. A tool according to claim 14 wherein each groove is defined at least partially by a sidewall, each sidewall extending perpendicular to an axis of the pin such that each groove defines a width that is uniform in a direction radially inward toward the axis of the pin.

19. A tool according to claim 14 wherein each groove defines a depth defined by the radial distance between an inner diameter of the groove and an outer diameter of each ridge, each groove defines a width in the axial direction of the pin at an outer diameter of the groove, and the width of each groove is at least about twice the depth of the groove.

20. A tool according to claim 14 wherein each groove defines a width in the axial direction of the pin at an outer diameter of the groove, and the width of each groove is between about 0.025 and 0.25 inches.

21. A tool according to claim 14 wherein each of the first and second shoulders defines a surface structured to frictionally engage the workpiece and least partially form the friction stir weld joint.

22. A tool according to claim 14 wherein the second shoulder is adjustable relative to the first shoulder, thereby adjusting the length of the stirring portion of the pin between the shoulders.

23. A tool according to claim 14 wherein each of the shoulders defines a taper at en outer circumference thereof.

24. A tool according to claim 14 wherein each of the grooves defines a circular circumference having a first diameter and each of the ridges defines a circular circumference having a second diameter.

25. A tool according to claim 14 wherein the pin defines at least one surface extending at least partially along the length of the stirring portion of the pin such that the surface interrupts the grooves and ridges of the pin.

26. A tool for forming a friction stir weld joint in a workpiece, the tool comprising:
    a first shoulder structured to be urged against the workpiece; and
    a rotatable pin extending from the first shoulder, the rotatable pin having first and second ends and defining a stirring portion therebetween structured to frictionally engage the workpiece so as to at least partially form the friction stir weld joint,
    wherein the stirring portion of the pin defines at least two disconnected grooves and a ridge therebetween separating the grooves, each groove defining a width in the axial direction of the pin at an outer diameter of the groove, and the width of each groove being between about 0.025 and 0.25 inches.

27. A tool according to claim 26 wherein each groove extends in a continuous and circumferential path around the pin.

28. A tool according to claim 26 wherein each groove is defined at least partially by a sidewall, each sidewall extending at an oblique angle relative to an axis of the pin such that each groove tapers in width in a direction radially inward toward the axis of the pin.

29. A tool according to claim 26 wherein each groove is defined at least partially by a sidewall, each sidewall extending perpendicular to an axis of the pin such that each groove defines a uniform width.

30. A tool according to claim 26 wherein each groove defines a depth defined by the radial distance between an inner diameter of the groove and an outer diameter of each ridge, each groove defines a width in the axial direction of the pin at an outer diameter of the groove, and the width of each groove is at least about twice the depth of the groove.

31. A tool according to claim 26 further comprising a second shoulder opposed to the first shoulder, the pin extending between the first and second shoulders.

32. A tool according to claim 31 wherein at least one of the shoulders defines at least one frictional feature thereon.

33. A tool according to claim 31 wherein the second shoulder is adjustable relative to the first shoulder such that a length of the stirring portion of the pin between the shoulders is configured to be adjusted.

34. A tool according to claim 31 wherein at least one of the shoulders defines a taper at an outer circumference thereof.

35. A tool according to claim 26 wherein each of the grooves defines a circular circumference having a first diameter and each of the ridges defines a circular circumference having a second diameter.

36. A tool according to claim 26 wherein the pin defines at least one surface extending at least partially along the length of the stirring portion of the pin such that the surface interrupts the grooves and ridges of the pin.

37. A method of friction stir welding a workpiece, the method comprising:
    providing a pin extending from a first shoulder, the pin defining a stirring portion structured to frictionally engage the workpiece, the stirring portion defining at least one groove and at least one ridge, each groove and ridge extending perpendicular to an axis of the pin;

rotating the pin with the first shoulder such that at least the stirring portion of the pin and the first shoulder frictionally engage the workpiece to thereby form a friction stir weld joint; and urging the rotating pin in a direction generally perpendicular to the axial direction of the pin such that the pin moves parallel to a plane defined by the grooves and ridges thereof.

38. A method according to claim 37 wherein said providing step comprises providing the pin extending between the first shoulder and a second shoulder disposed in an opposing configuration to the first shoulder, and wherein the method further comprises frictionally engaging the workpiece with each shoulder during said rotating and urging steps.

39. A method according to claim 38 further comprising adjusting the second shoulder relative to the first shoulder and thereby adjusting a length of the stirring portion of the pin between the shoulders.

40. A method according to claim 38 wherein said providing step comprises:

drilling an aperture in the workpiece;

inserting a connection portion of the pin through the aperture in the workpiece such that the first shoulder is structured to frictionally engage a first side of the workpiece; and connecting the connection portion of the pin to the second shoulder configured to frictionally engage a second side of the workpiece opposite the first side.

41. A method according to claim 37 further comprising moving the stirring portion of the pin through the workpiece along a predetermined path.

42. A method according to claim 37 further comprising providing the workpiece, the workpiece including at least two structural members formed of different materials.

* * * * *